United States Patent Office 3,130,046
Patented Apr. 21, 1964

3,130,046
ELECTROPHOTOGRAPHIC REPRODUCTION
MATERIAL
Heinz Schlesinger, Wiesbaden, Germany, assignor, by mesne assignments, to Azoplate Corporation, Murray Hill, N.J.
No Drawing. Filed Dec. 4, 1959, Ser. No. 857,269
Claims priority, application Germany Jan. 7, 1959
26 Claims. (Cl. 96—1)

Among modern reproduction processes, the electrophotographic process, also known as xerography, is becoming of increasing importance. It is a dry process of particular interest in certain fields, for example, office duplicating, and it consists in the application to a material consisting of an electrically conductive support and a photoconductive layer adherent thereto, of an electrostatic charge which imparts to the photoconductive layer the property of light-sensitivity. Such light-sensitive material can be used for the production of images by electrophotographic means. It is exposed to light beneath a master, so that the material is discharged in the parts of the photoconductive layer struck by light. The invisible electrostatic image thereby produced is made visible (developed) by powdering over with finely divided, colored synthetic resin and given permanence (fixed) by the application of heat to the support.

Known materials used for the preparation of the photoconductive layers required for the aforedescribed process include selenium, sulfur, zinc oxide, and also organic substances such as anthracene or anthraquinone. Consideration has also been given to a method of preparing the photoconductive layers whereby the photoconductive substances in association with bonding agents are dispersed in solvents, applied thus to electrically conductive supports, primarily metal foils, and dried. However, the photoelectrically sensitizable material thus obtained has not yet satisfied the extensive demands made of modern duplicating material in respect of range of use, reliability, simplicity in handling and, not least in importance, light sensitivity and keeping qualities.

Now it has been found that if as photoconductive substances compounds corresponding to the general formula

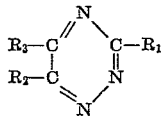

in which $R_1$, $R_2$ and $R_3$ are aryl or substituted aryl radicals or heterocyclic radicals of aromatic character, and may be different from each other, are used, unexpectedly successful photoelectrically sensitizable layers with a surprising range of practical applications are produced.

The 1,2,4-triazine compounds of the above general formula which are to be used in accordance with the present invention are prepared by known procedures; see P. V. Laakso, R. Robinson and H. P. Vandrewala, Tetrahedron 1, page 103. The compounds are obtained by condensation of equimolecular quantities of 1,2-diketones and carboxylic acid hydrazides in warm glacial acetic acid to which some ammonium acetate is added. For the preparation of the 3-(4'-dimethylaminophenyl)-5,6-diphenyl-1,2,4-triazine, e.g., a solution of 2 g. of benzil and 1.7 g. of 4-dimethylamino-benzoic acid hydrazide in 20 ml. of glacial acetic acid, to which 20 g. of ammonium acetate had been added, is heated for 15 minutes in a reflux condenser. Even during the heating process the reaction product precipitates in the form of a crystalline substance which is filtered by suction when it has cooled down. It is purified by recrystallization from acetic ester and forms then bright-red crystals which melt at 196–198° C.

The other 1,2,4-triazine compounds to be used in accordance with the present invention are prepared analogously, if necessary with slight changes in the conditions obtaining during reaction, such as the quantity of glacial acetic acid used, time of heating, etc. In those cases in which the reaction product does not precipitate during the heating or cooling process, it is separated by pouring the reaction mixture into water. Suitable solvents for recrystallizing the crude products are mainly methanol, ethanol, acetic ester, and ethylene glycol monomethyl ether, or mixtures of several of these solvents.

If unilaterally substituted 1,2-diketones are used in the reaction, as can be expected, mixtures of two different 1,2,4-triazines are obtained. For instance, by the reaction of 4-methoxybenzil with 4-dimethylaminobenzoic acid hydrazide under the conditions stated above, a mixture is obtained of 3-(4'-dimethylamino-phenyl)-5-(4''-methoxy-phenyl)-6-phenyl-1,2,4-triazine, corresponding to Formula 4, and 3-(4'-dimethylamino-phenyl)-5-phenyl-6-(4''-methoxy-phenyl)-1,2,4-triazide, corresponding to Formula 5. Mixtures of this kind are equally suited for the production of photoelectrically sensitizable layers.

Exemplary of the compounds contemplated by the present invention are the following:

FORMULA 1

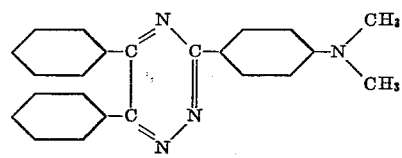

FORMULA 2

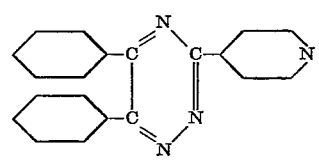

FORMULA 3

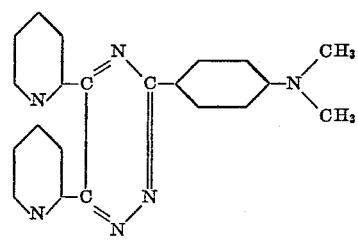

FORMULA 4

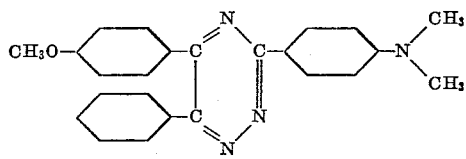

FORMULA 5

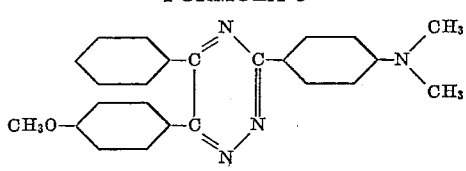

FORMULA 6 — 1,2-bis(4-dimethylaminophenyl)-3-phenyl-1,2,4-triazine (structure)

FORMULA 7

FORMULA 8

FORMULA 9

FORMULA 10

FORMULA 11

FORMULA 12

FORMULA 13

FORMULA 14

FORMULA 15

FORMULA 16

FORMULA 17

FORMULA 18

FORMULA 19

FORMULA 20

FORMULA 21

FORMULA 22
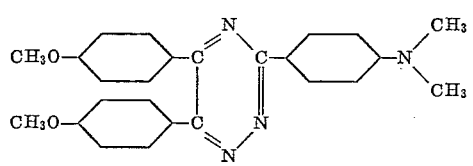

FORMULA 23
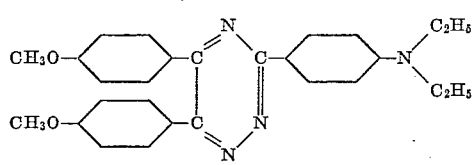

FORMULA 24
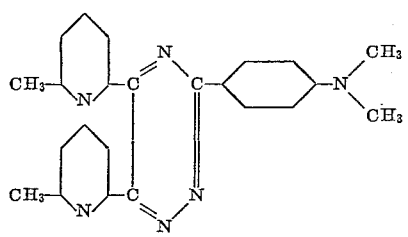

FORMULA 25
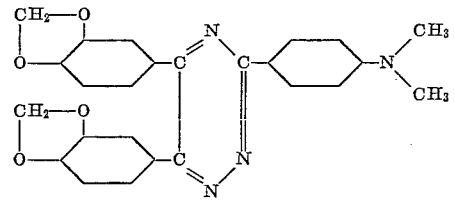

FORMULA 26
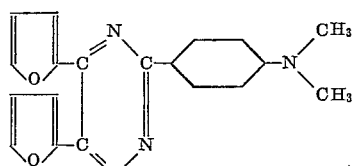

FORMULA 27
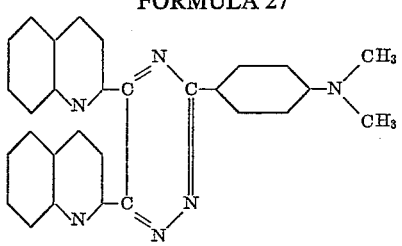

FORMULA 28
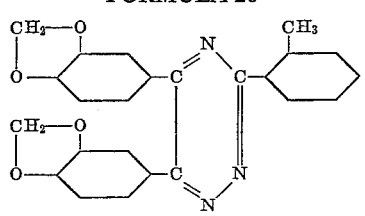

FORMULA 29
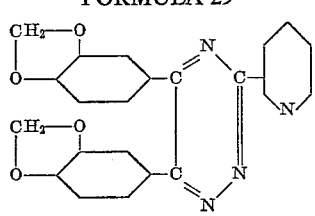

FORMULA 30
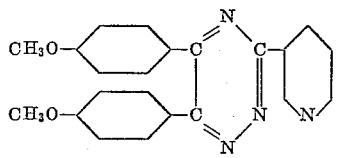

FORMULA 31
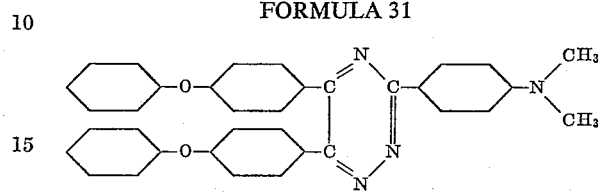

FORMULA 32
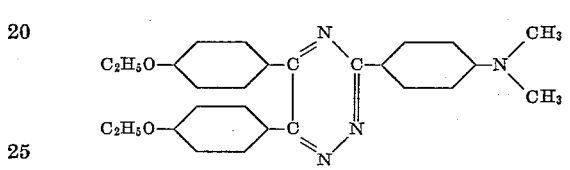

FORMULA 33
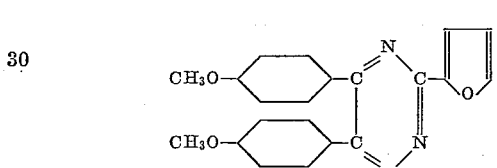

FORMULA 34
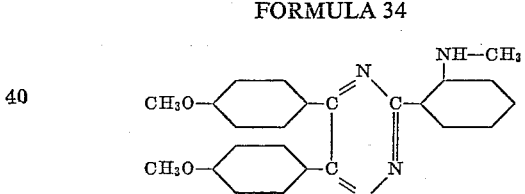

FORMULA 35
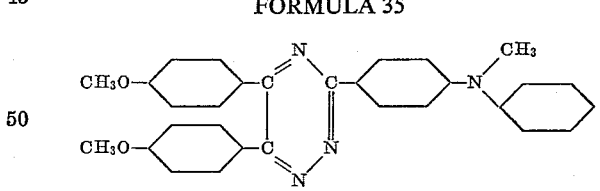

FORMULA 36
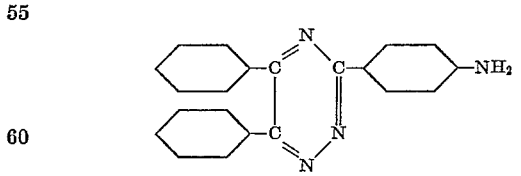

In the following schedule, details are given of some examples of compounds corresponding to the above general formula which are to be used as provided by the present invention. In this schedule there is given In column 1: the number under which the constitutional formula of the compound in question is listed above,
In column 2: the 1,2-diketone used in the reaction,
In column 3: the carboxylic acid-hydrazide used in the reaction,
In column 4: the melting point (° C.) of the 1,2,4-triazine in question, and
In column 5: the color of the 1,2,4-triazine in question.

| 1 | 2 | 3 | 4 | 5 |
|---|---|---|---|---|
| 1 | benzil | 4-dimethylamino benzoic acid hydrazide. | 196-198 | bright red. |
| 2 | do | isonicotinic acid hydrazide | 161-162 | light yellow. |
| 3 | 2,2'-pyridil | 4-dimethylamino benzoic acid hydrazide. | 189-190 | orange. |
| 4+5 | 4-methoxybenzil | do | 166 after sintering. | yellow. |
| 6+7 | 4-dimethyl aminobenzil. | benzoic acid hydrazide | 160-64 after sintering. | Do. |
| 8+9 | do | 4-dimethylamino benzoic acid hydrazide. | 217-218 after sintering. | Do. |
| 10 | 2,2'-pyridil | isonicotinic acid hydrazide | 181-182 | light yellow. |
| 11+12 | 4-dimethyl aminobenzil. | do | 194-196 after sintering. | orange. |
| 13 | 2,2'-pyridil | 2-hydroxy-3-naphthoic acid hydrazide. | 209-211 | pale yellow. |
| 14 | do | 4-aminobenzoic acid hydrazide. | 224-225 | yellow. |
| 15+16 | 4-dimethyl aminobenzil. | 4-methoxy-benzoic acid hydrazide. | 175-177 after sintering. | Do. |
| 17 | benzil | diphenyl-4-carboxylic acid hydrazide. | 204-205 | Do. |
| 18 | 2,2'-pyridil | do | 178-180 | yellow green. |
| 19 | 4,4'-dimethoxy benzil. | benzoic acid hydrazide | 164-165 | light yellow. |
| 20 | do | isonicotinic acid hydrazide | 155-156 | yellow. |
| 21 | do | 4-methoxy benzoic acid hydrazide. | 147-148 | light yellow. |
| 22 | do | 4-dimethylamino benzoic acid hydrazide. | 194-195 | yellow. |
| 23 | do | 4-diethylamino benzoic acid hydrazide. | 188-189 | Do. |
| 24 | 6,6'-dimethyl 2,2'-pyridil. | 4-dimethylamino benzoic acid hydrazide. | 167-168 | Do. |
| 25 | bis-3,4-methylene-dihydroxy benzil. | do | 244-245 | Do. |
| 26 | 2,2'-furyl | do | 177-178 | brown. |
| 27 | 2,2'-quinaldil | do | 231-232 | bright red. |
| 28 | bis-3,4-methylene-dihydroxy benzil. | o-toluylic acid hydrazide | 195-196 | light green. |
| 29 | do | nicotinic acid hydrazide | 156-157 | light yellow. |
| 30 | 4,4'-dimethoxy benzil. | do | 163-164 | yellow. |
| 31 | 4,4'-diphenoxy benzil. | 4-dimethylamino benzoic acid hydrazide. | 160-161 | Do. |
| 32 | 4,4'-diethoxy benzil. | do | 196-197 | Do. |
| 33 | 4,4'-dimethoxy benzil. | furane-2-carboxylic acid hydrazide. | 155-156 | light yellow. |
| 34 | do | 2-methyl-amino benzoic acid hydrazide. | 145-146 | yellow. |
| 35 | do | N-methyldiphenyl amino-4-carbo-hydrazide. | 151 | Do. |
| 36 | benzil | 4-aminobenzoic acid hydrazide. | 219-220 | Do. |

The compounds to be used as provided by the invention have very good photoconductivity and are particularly suitable for the production of homogeneous coatings with unlimited shelf life.

The 1,2,4-triazines to be used as provided by the invention for the preparation of the photoconductive layers are best used in solution with organic solvents, such as benzene, acetone, methylene-chloride, ethylene-glycol monomethylether, etc.; mixtures of several of the 1,2,4-triazines may be used, as well as mixtures of several solvents. Further, it is possible for the 1,2,4-triazines being used as provided by the invention to be used in admixture with other organic photoconductive substances.

As has further been discovered, it can be an advantage in the production of the photoconductive layers for organic resins to be used in association with the 1,2,4-triazine compounds corresponding to the above given general formula. As examples there may be mentioned:

The natural and synthetic resins, e.g. balsam resins, phenol resins modified with colophony and other resins of which colophony constitutes the major part, cumarone resins and indene resins and the substances covered by the collective term "synthetic lacquer resins," which according to Kunststofftaschenbuch (Plastics Pocket Book), published by Saechtling-Zebrowski (11th edition, 1955, page 212 onwards) include processed natural substances such as cellulose ether;

Polymers such as the polyvinyl chlorides, polyvinyl acetate, polyvinyl acetals, polyvinyl ethers, polyacrylic and polymethacrylic esters, as also polystyrene and isobutylene; polycondensates, e.g. polyesters, such as phthalate resins, alkyd resins, maleinate resins, maleic acid/colophony/mixed esters of higher alcohols, phenol-formaldehyde resins, particularly colophony-modified phenol-formaldehyde condensates, urea-formaldehyde resins, melamine-formaldehyde condensates, aldehyde resins, ketone resins, especially the so-called AW 2 resins, xylene-formaldehyde resins and polyamides; and polyadducts, such as polyurethanes.

If the triazine compounds to be used as provided by the invention are used in association with organic resins, the proportion of resin to photoconductive substance can vary very greatly. The use of mixtures of approximately equal parts by weight of resin and triazine compound has been found advantageous.

By coating the support material with the solutions containing the photoconductive substance and the added organic resins there are obtained homogeneous, transparent, mostly colorless layers which can be considered as solid solutions.

The base materials used as electroconductive supports may be any that satisfy the requirements of xerography, e.g. metal or glass plates, paper or plates or foils made of electrically conductive resins, or plastic resins. If paper is to be used as a support for the photoconductive layer, pretreatment of the paper against penetration of the coating solution is advisable, e.g. with an aqueous solution of methyl cellulose or polyvinyl alcohol or with a solution of a copolymer of acrylic acid methyl ester and acrylonitrile in a mixture of acetone and methyl ethyl ketone or with solutions of polyamides in aqueous lower alcohols. Aqueous dispersions of such substances suitable for the pretreatment of the paper surface may also be used.

The solutions of the 1,2,4-triazine compounds to be used as provided by the invention, with or without the resins, are applied to the supports in the usual manner, for example by spraying, by direct applications, by means of rollers, etc., and then dried so as to produce a homogeneous photoconductive layer on the support.

The layers are in themselves non-light-sensitive. However, after an electrostatic charge has been applied to the layers, i.e. after they have been charged by means of, for example, a corona discharge, the layer is light-sensitive and can be used with long wave U.V. light of 3600–4200 A. for electrophotographic image production. Very short exposure under a master to a high pressure mercury lamp will give good images.

The further discovery has been made that the spectral sensitivity of the photoconductive layer can be extended by means of sensitizers into the visible part of the spectrum. The amount of sensitizers to be added to the photoconductive substance depends on the type of sensitizer and on the composition of the electrophotographic layer and it may vary within wide limits. For example, good sensitizing effects are obtained with an addition of 0.05 percent of Rhodamine B extra (Schultz' "Farbstofftabellen," 7th edition, volume 1, No. 864). Particularly suitable as sensitizers are dyestuffs of which for readier identification the number is given under which they are listed in Schultz' "Farbstofftabellen" (7th edition, volume 1, 1931). The following dyestuffs are given as examples of particularly effective sensitizers.

Triarylmethane dyes:
    Brilliant Green, No. 760, page 314
    Victoria Blue B, No. 822, page 347
    Methyl violet, No. 783, page 327
    Crystal violet, No. 785, page 329
    Acid violet 6B, No. 831, page 351
Xanthene dyes:
    Rhodamines—
        Rhodamine B, No. 864, page 365
        Rhodamine 6G, No. 866, page 366
        Rhodamine G extra, No. 865, page 366
    Sulphorhodamine B, No. 863, page 364
    True Acid Eosin G, No. 870, page 368
Phthaleins:
    Eosin S, No. 883, page 375
    Eosin A, No. 881, page 374
    Erythrosin, No. 886, page 376
    Phloxin, No. 890, page 378
    Rose Bengal, No. 889, page 378
    Fluorescein, No. 880, page 373
Thiazine dyes: Methylene blue, No. 1038, page 449
Acridine dyes:
    Acridine yellow, No. 901, page 383
    Acridine orange, No. 908, page 387
    Trypaflavine, No. 906, page 386
Quinoline dyes:
    Pynacyanol, No. 924, page 396
    Cryptocyanine, No. 927, page 397
Quinone dyestuffs.
Ketone dyestuffs:
    Alizarin, No. 1141, page 499
    Alizarin red S, No. 1145, page 502
    Quinizarine, No. 1148, page 504
Cyanine dyes: Cyanine, No. 921, page 394
Chlorophyll.

The production of images by electrophotographic means is carried out as follows: When the photoconductive layer has been charged, by means of, for example, a corona discharge with a charging apparatus maintained at 6000–7000 volts, the support, e.g. paper or aluminum foil or plastic foil, with the sensitized photoconductive layer, is exposed to light under a master or by episcopic or diascopic projection and is then dusted over in known manner with a resin powder colored with carbon black. The image that now becomes visible can easily be wiped off. It therefore has to be fixed; it can, for example, be briefly heated to about 120° C. or, according to the fusion temperature of the developer used, it can be exposed to infra-red radiation. The temperature required is less if the heat treatment is carried out in the presence of vapors of solvents such as trichloroethylene, carbon tetrachloride or ethyl alcohol. The fixing of the powder image can also be done by steam treatment. There are obtained copies corresponding to the masters which are characterized by good contrast.

A particular advantage of the electrophotographic images prepared in accordance with the invention consists in the fact that after being fixed these images can be converted into a printing plate, if the support, e.g. paper or plastic foil, is wiped over with a solvent for the photoconductive layer, e.g. alcohol or acetic acid. This treatment removes the image-free parts of the layer, so that the support can now be wetted with water. It is then inked up in known manner with greasy ink whereby the ink adheres only to the imaged parts. In this way printing plates are obtained which can be set up in an offset machine and used for printing. Very long runs are possible.

If transparent supports are used, the electrophotographic images can also be used as masters for the production of further copies on any sort of light-sensitive sheets. In this respect the photoconductive compounds to be used as provided by the invention are superior to the substances used hitherto, such as selenium or zinc oxide, inasmuch as the latter give only cloudy layers not capable of further reproduction, because homogeneous solutions cannot be produced with these materials and only suspensions are possible.

If translucent supports are used for photoconductive layers such as are provided by the invention, reflex images can be produced also. The production of a reflex copy is also an advantage over the known art.

Moreover, the photoconductive layers prepared in accordance with the invention have a further important advantage in that they can be charged positively as well as negatively. With positive charging, the images are particularly good and evolution of ozone is scarcely to be detected, which, with negative charging, is very copious and requires special measures, such as the application of air fans, to counteract the adverse effects thereof.

The invention will be further illustrated by reference to the following specific examples:

*Example 1*

0.25 g. of 3-(4'-dimethylamino-phenyl)-5,6-di-(4''-methoxy-phenyl)-1,2,4-triazine, corresponding to Formula 22, and 0.25 g. of a ketone resin, e.g. the product commercially available under the name "Kunstharz SK," are dissolved in a mixture consisting of 7.5 ml. of ethyleneglycol monomethylether and 5 ml. of benzene. The solution is coated onto paper, the surface of which had been pretreated to prevent penetration of organic solvents, and dried. The thus coated paper is used for producing a direct image by an electrophotographic process, as follows: By means of a charging apparatus maintained at about 6000 volts the coated dried layer is given a negative electric charge, then exposed under a master to the light of a high pressure mercury lamp, and finally dusted with a developer powder in known manner. A positive image of the original becomes visible which is then fixed by slightly heating. The background of the paper is brightened up by the layer coated onto the support. The developer consists of the toner and the carrier. The toner is composed of polystyrene of low melting point, colophony and carbon black, to which an organic dyestuff may be added, e.g. spirit-soluble nigrosin (Schultz' "Farbstofftabellen," 7th edition, volume 1, No. 985); the components are melted with each other, ground and fractionated by screening. The most suitable fraction is that with grain size of 20 to 60μ. The toner prepared in this way is mixed with a carrier substance of such nature that the toner becomes triboelectrically charged with a charge that is the opposite of that produced on the paper, e.g. glass balls or iron filings.

The triazine corresponding to Formula 22 can be replaced in the above solution by the same quantity of a mixture obtained by condensation of 4-methoxy-benzil with 4-dimethylaminobenzhydrazide and ammonium acetate and consisting of 1,2,4-triazine, corresponding to Formula 4, and 1,2,4-triazine, corresponding to Formula 5.

Example 2

0.5 g. of 3-(4'-dimethylamino-phenyl)-5,6-di-(4''-methoxy-phenyl)-1,2,4-triazine, corresponding to Formula 22, and 0.5 g. of a ketone resin, e.g. of the product commercially available under the designation "Kunstharz EM" and prepared by polycondensation, are dissolved in 15 ml. of ethyleneglycol monomethylether and the solution is coated onto an aluminum foil. After evaporation of the solvent a layer remains on the surface of the foil which firmly adheres thereto. By the process described in Example 1 an image (powder image) of an original is electrophotographically produced on the aluminum foil and, by means of a transfer process, copies of good contrast are produced from this image on paper.

Equally good results are obtained if the solution used for coating the aluminum foil is prepared from 0.5 g. of 3,5,6-tri(4'-methoxy-phenyl)-1,2,4-triazine, corresponding to Formula 21, and 0.5 g. of the same ketone resin.

Example 3

0.25 g. of 3-(4'-dimethylamino-phenyl)-5,6-dipyridil-(2'')-1,2,4-triazine, corresponding to Formula 3, and 0.25 g. of a coumarone resin, e.g. of the product commercially available under the designation "Cumaron-Harz 601/90" are dissolved in a mixture of 7.5 ml. of ethyleneglycol monomethylether and 5 ml. of benzene. The solution is coated onto a superficially roughened aluminum foil. After evaporation of the solvent a firmly adherent layer remains on the surface of the foil. The following procedure is as described in Example 1. After fixing the powder image a positive image is obtained on the aluminum foil. This image is transformed into a printing plate by wiping over the aluminum foil either with 50 percent acetic acid or 60 percent ethanol, rinsing with water, treating with 1 percent phosphoric acid and finally inking with greasy ink. A positive printing plate is thus obtained from which prints can be made in an offset apparatus.

Example 4

0.25 g. of 3-(4'-dimethylamino-phenyl)-5,6-di-(4''-methoxy-phenyl)-1,2,4-triazine, corresponding to Formula 22, and 0.25 g. of a resin-modified maleic acid resin, e.g. of the product commercially available under the registered trademark "Beckacite" K–125 are dissolved in a mixture consisting of 7.5 ml. of ethyleneglycol monomethylether and 5 ml. of benzene. The solution is coated onto paper and dried. After evaporation of the solvent, an electrophotographic image is produced on the paper as described in Example 1.

In the above described solution, the triazine corresponding to Formula 22 may be replaced by the same quantity of a mixture consisting of 3-(4'-dimethylamino-phenyl)-5-(4''-methoxy-phenyl)-6-phenyl - 1,2,4 - triazine, corresponding to Formula 4, and 3-(4'-dimethylamino-phenyl)-5-phenyl-6-(4''-methoxy-phenyl) - 1,2,4 - triazine corresponding to Formula 5.

Example 5

25 g. of 3 - (4'-dimethylamino-phenyl)-5,6-dipyridil-(2')-1,2,4-triazine, corresponding to Formula 3, and 25 g. of a ketone resin, e.g. of the product sold under the designation "Kunstharz SK," are dissolved in a mixture consisting of 750 ml. of ethyleneglycol monomethylether and 500 ml. of benzene. This solution is coated onto paper by means of a hopper device and the coated solution is dried. By a process as described in Example 1, a direct image is electrophotographically produced on the coated paper. The light sensitivity of the electrostatically charged layer is good. From originals printed or typed on both sides, images with very good contrast are produced by means of an episcopic process.

Example 6

A mixture consisting of 0.08 g. of 3-(4'-amino-phenyl)-5,6-diphenyl-1,2,4-triazine, corresponding to Formula 36, 0.08 g. of 3-(4'-dimethylamino-phenyl)-5,6-di-(4''-methoxy-phenyl)-1,2,4-triazine, corresponding to Formula 22, and 0.08 g. of 3-(4'-dimethylamino-phenyl)-5,6-pyridil-(2'')-1,2,4-triazine, corresponding to Formula 3, is dissolved in a solvent mixture consisting of 8 ml. of ethyleneglycol monomethylether and 5 ml. of benzene. The solution is coated onto an aluminum foil, as described in Example 2, and an electrophotographic image is produced on the coated foil in the usual manner.

Example 7

0.25 g. of a mixture consisting of 3-(4'-dimethyl-amino-phenyl)-5-(4''-methoxyphenyl)-6-phenyl - 1,2,4 - triazine, corresponding to Formula 4, and 3-(4'-dimethylamino-phenyl)-5-phenyl-6-(4''-methoxyphenyl) - 1,2,4 - triazine, corresponding to Formula 5, and 0.25 g. of a zinc resin, e.g. of the product commercially available under the registered trademark "Erkazit" Zinkharz 165 are dissolved in a mixture of 7.5 ml. of ethyleneglycol monomethylether and 5 ml. of benzene. The solution is coated onto an aluminum foil and dried. After the coated foil has been given a negative charge, by means of a corona discharge, it is exposed under an original to the light of a mercury lamp and then dusted, as described in Example 1, with a developer powder consisting of a carrier and a resin powder colored by means of carbon black. An image of the original becomes visible which is then fixed by heating.

Example 8

0.25 g. of a mixture consisting of 3-(4'-dimethylamino-phenyl) - 5 - (4''-methoxyphenyl)-6-phenyl-1,2,4-triazine, corresponding to Formula 4, and 3-(4'-dimethylamino-phenyl) - 5-phenyl-6-(4''-methoxy-phenyl)-1,2,4-triazine, corresponding to Formula 5 (obtained by condensation of 4-methoxy-benzil with 4-dimethylamino-benzhydrazide and ammonium acetate), and 0.25 g. of coumarone resin, e.g. 0.25 g. of the product commercially available under the designation "Cumaronharz" 601/90, are dissolved in a mixture consisting of 7.5 ml. of ethyleneglycol monomethylether and 5 ml. of benzene. This solution is coated onto a transparent paper, the surface of which had been pretreated to prevent penetration of organic solvents, and dried. By means of an electrophotographic process an image is produced on the coated transparent paper and fixed, either by heating or by treatment with trichloroethylene vapors. The fixed image may be used as an intermediate original for making further reproductions e.g. on diazotype paper.

Example 9

0.5 g. of a mixture containing 3-pyridil-(4')-5-(4''-dimethylamino-phenyl)-6-phenyl-1,2,4-triazine, corresponding to Formula 11, and 3-pyridil-(4')-5-phenyl-6-(4''-dimethylamino - phenyl) - 1,2,4 - triazine, corresponding to Formula 12 (obtained by the condensation of 4-dimethylamino-benzil and isonicotinic acid hydrazide and ammonium acetate), are, together with 0.5 g. of unsaponified ketone-aldehyde condensation resin, e.g. of the product sold under the name "Kunstharz AP," dissolved in 15 ml. of ethyleneglycol monomethylether. The solution is evenly coated onto an aluminum foil. After evaporation of the solvent, a firmly adherent layer remains on the aluminum foil. By analogy to the process described in Example 1, an electrophotographic image is produced on the foil coated in this manner.

*Example 10*

0.25 g. of 3-(4'-amino-phenyl)-5,6-di-phenyl-1,2,4-triazine, corresponding to Formula 36, 0.25 g. of a ketone resin, e.g. of the product sold under the designation "Kunstharz SK," and 0.125 mg. of Rhodamine B extra (Schultz' "Farbstofftabellen," 7th edition, volume 1, No. 864) are dissolved in a mixture consisting of 7.5 ml. of ethyleneglycol monomethylether and 5 ml. of benzene. The solution is coated onto paper which is not transparent but light-permeable, and the surface of which had been pretreated to prevent penetration of organic solvents. After drying, the coated paper is given a positive charge by means of a corona discharge and then it is placed with its layer side onto a book page printed on both sides, which had been backed with black paper, and the uncoated side of the paper is exposed to the light of a 200 watt incandescent lamp; e.g. exposure of the book page serving as the original is effected through the non-transparent light-permeable paper. The electrostatic image thus produced on the coated paper is developed by dusting over with a developer powder the carrier of which consists of glass balls surrounded by a resin. A positive mirror image of the book page is obtained that is very rich in contrast. A non-reverse image may be obtained by transferring the unfixed reverse powder image onto a transfer material, e.g. paper or plastic foil, using in a manner known per se an electric field. If a transparent paper or plastic foil is used the fixed non-reverse image may be used as an intermediate original for making further copies, e.g. on diazotype paper.

*Example 11*

0.25 g. of the mitxure used in Example 8 and consisting of 3 - (4'-dimethylamino-phenyl)-5-(4''-methoxyphenyl)-6-phenyl-1,2,4-triazine, corresponding to Formula 4, and 3 - (4' - dimethylamino-phenyl)-5-phenyl-6-(4''-methoxyphenyl)-1,2,4-triazine, corresponding to Formula 5, 0.25 g. of a zinc resin, e.g. of the product sold under the registered trademark "Erkazit" Zinkharz 165, and 0.125 mg. of Eosin S (Schultz' "Farbstofftabellen," 7th edition, volume 1, No. 883) are dissolved in a mixture consisting of 7.5 ml. of ethyleneglycol monomethylether and 5 ml. of benzene. The solution is coated onto paper and dried. After the paper has been given a negative charge by means of a corona discharge it is exposed under an original to the light of a 200 watt incandescent lamp and then dusted over, as described in Example 1, with a resin powder colored with carbon black. An image corresponding to the master becomes visible which is fixed by heating.

*Example 12*

10 g. of a ketone resin, e.g. of the product obtained by polycondensation and sold under the designation "Kunstharz EM," are dissolved in 150 ml. of ethanol, 10 g. of 3 - (4' - dimethylamino - phenyl) - 5,6-di-(4''-methoxyphenyl)-1,2,4-triazine, corresponding to Formula 22, are added to the solution and the suspension thus obtained is finely ground in a ball mill. Thereafter the suspension is used for mechanically coating paper, the surface of which had been pretreated to prevent penetration by organic solvents. By analogy to the process described in Example 1 electrophotographic images are produced on the coated and dried paper.

It will be obvious to those skilled in the art that many modifications may be made within the scope of the present invention without departing from the spirit thereof, and the invention includes all such modifications.

What is claimed is:

1. An electrophotographic material comprising a conductive support layer and a photoconductive insulating layer, the latter comprising a compound having the formula

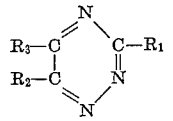

in which $R_1$, $R_2$, and $R_3$ are selected from the group consisting of aryl and heterocyclic groups of aromatic character.

2. An electrophotographic material according to claim 1 in which the photoconductive layer contains a dyestuff sensitizer.

3. An electrophotographic material according to claim 1 in which the photoconductive layer contains an organic colloid.

4. An electrophotographic material comprising a conductive support layer and a photoconductive insulating layer, the latter comprising a compound having the formula

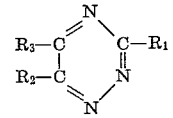

in which $R_1$, $R_2$, and $R_3$ are aryl groups.

5. An electrophotographic material comprising a conductive support layer and a photoconductive insulating layer, the latter comprising a compound having the formula

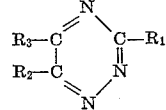

in which $R_1$ is an aryl group and $R_2$ and $R_3$ are heterocyclic groups of aromatic character.

6. An electrophotographic material comprising a conductive support layer and a photoconductive insulating layer, the latter comprising a compound having the formula

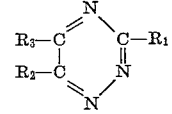

in which $R_1$, $R_2$, and $R_3$ are heterocyclic groups of aromatic character.

7. A photographic reproduction process which comprises exposing an electrostatically charged photoconductive insulating layer, on a conductive support, to light under a master and developing the resulting image with an electroscopic material, the photoconductive layer comprising a compound having the formula

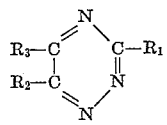

in which $R_1$, $R_2$, and $R_3$ are selected from the group consisting of aryl, and heterocyclic groups of aromatic character.

8. A process according to claim 7 in which the photoconductive layer contains a dyestuff sensitizer.

9. A process according to claim 7 in which the photoconductive layer contains an organic colloid.

10. A photographic reproduction process which comprises exposing an electrostatically charged photoconductive insulating layer, on a conductive support, to light under a master and developing the resulting image with an electroscopic material, the photoconductive layer comprising a compound having the formula

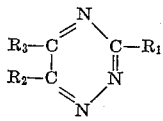

in which $R_1$, $R_2$, and $R_3$ are aryl groups.

11. A photographic reproduction process which comprises exposing an electrostatically charged photoconductive insulating layer, on a conductive support, to light under a master and developing the resulting image with an electroscopic material, the photoconductive layer comprising a compound having the formula

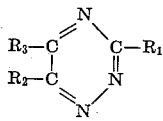

in which $R_1$ is an aryl group and $R_2$ and $R_3$ are heterocyclic groups of aromatic character.

12. A photographic reproduction process which comprises exposing an electrostatically charged photoconductive insulating layer, on a conductive support, to light under a master and developing the resulting image with an electroscopic material, the photoconductive layer comprising a compound having the formula

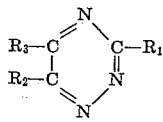

in which $R_1$, $R_2$, and $R_3$ are heterocyclic groups of aromatic character.

13. An electrophotographic material comprising a conductive support layer and a photoconductive insulating layer, the latter comprising a compound having the formula

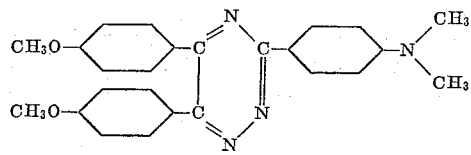

14. An electrophotographic material comprising a conductive support layer and a photoconductive insulating layer, the latter comprising a compound having the formula

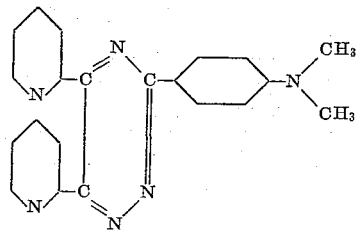

15. An electrophotographic material comprising a conductive support layer and a photoconductive insulating layer, the latter comprising a compound having the formula

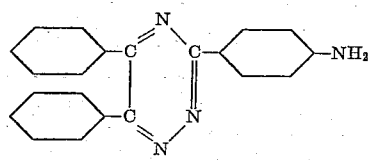

16. An electrophotographic material comprising a conductive support layer and a photoconductive insulating layer, the latter comprising a compound having the formula

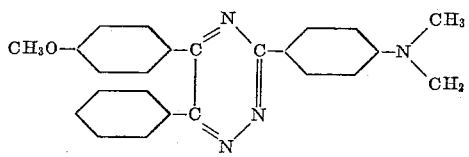

17. An electrophotographic material comprising a conductive support layer and a photoconductive insulating layer, the latter comprising a compound having the formula

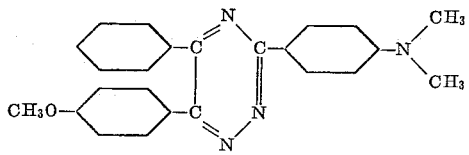

18. An electrophotographic material comprising a conductive support layer and a photoconductive insulating layer, the latter comprising a compound having the formula

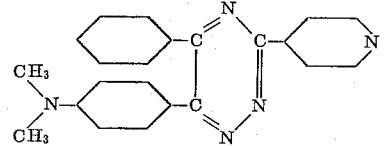

19. An electrophotographic material comprising a conductive support layer and a photoconductive insulating layer, the latter comprising a compound having the formula

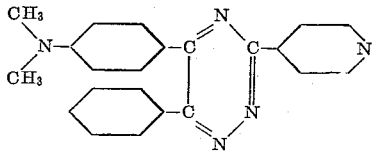

20. A photographic reproduction process which comprises exposing an electrostatically charged photoconductive insulating layer, on a conductive support, to light under a master and developing the resulting image with an electroscopic material, the photoconductive layer comprising a compound having the formula

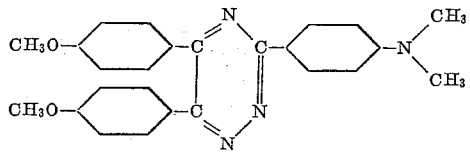

21. A photographic reproduction process which comprises exposing an electrostatically charged photoconductive insulating layer, on a conductive support, to light under a master and developing the resulting image with an electroscopic material, the photoconductive layer comprising a compound having the formula

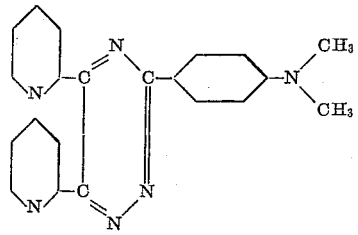

22. A photographic reproduction process which comprises exposing an electrostatically charged photoconductive insulating layer, on a conductive support, to light under a master and developing the resulting image with an electroscopic material, the photoconductive layer comprising a compound having the formula

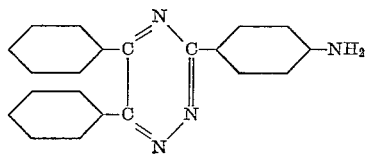

23. A photographic reproduction process which comprises exposing an electrostatically charged photoconductive insulating layer, on a conductive support, to light under a master and developing the resulting image with an electroscopic material, the photoconductive layer comprising a compound having the formula

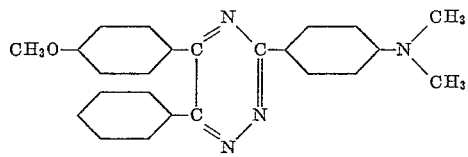

24. A photographic reproduction process which comprises exposing an electrostatically charged photoconductive insulating layer, on a conductive support, to light under a master and developing the resulting image with an electroscopic material, the photoconductive layer comprising a compound having formula

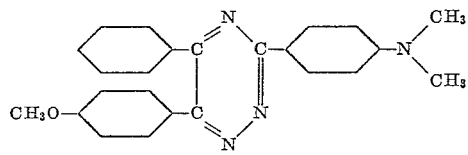

25. A photographic reproduction process which comprises exposing an electrostatically charged photoconductive insulating layer, on a conductive support, to light under a master and developing the resulting image with an electroscopic material, the photoconductive layer comprising a compound having the formula

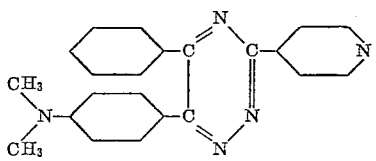

26. A photographic reproduction process which comprises exposing an electrostatically charged photoconductive insulating layer, on a conductive support, to light under a master and developing the resulting image with an electroscopic material, the photoconductive layer comprising a compound having the formula

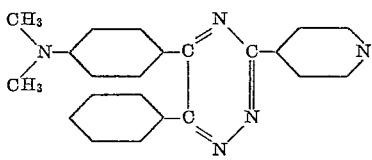

References Cited in the file of this patent

UNITED STATES PATENTS

| | | |
|---|---|---|
| 2,297,691 | Carlson | Oct. 6, 1942 |
| 2,663,636 | Middleton | Dec. 22, 1953 |

FOREIGN PATENTS

| | | |
|---|---|---|
| 878,823 | France | Nov. 2, 1942 |
| 811,182 | Great Britain | Apr. 2, 1959 |
| 1,176,457 | France | Nov. 24, 1958 |

OTHER REFERENCES

Winslow et al.: J.A.C.S. 77, 4751–6 (1955).
Lyons et al.: J. Chem. Soc. (1957), pp. 3648–3668.
C.A. 51: 13875–7 (1957).
C.A. 53: 3237e (1959).